United States Patent
Rao et al.

(10) Patent No.: US 7,571,221 B2
(45) Date of Patent: Aug. 4, 2009

(54) INSTALLATION OF NETWORK SERVICES IN AN EMBEDDED NETWORK SERVER

(75) Inventors: Raghav Rao, Sunnyvale, CA (US); Marc Nijdam, Mountain View, CA (US); Ravikumar Pisupati, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1432 days.

(21) Appl. No.: 10/115,403

(22) Filed: Apr. 3, 2002

(65) Prior Publication Data

US 2003/0191824 A1    Oct. 9, 2003

(51) Int. Cl.
G06F 15/16 (2006.01)
(52) U.S. Cl. ............ 709/220; 709/221; 709/222
(58) Field of Classification Search ......... 709/220–222, 709/205, 213, 219; 707/1; 712/216; 719/317, 719/319, 331, 332
See application file for complete search history.

(56) References Cited

U.S. PATENT DOCUMENTS

| | | | | |
|---|---|---|---|---|
| 5,455,932 A * | 10/1995 | Major et al. | ............ | 711/162 |
| 5,761,507 A * | 6/1998 | Govett | ............ | 718/101 |
| 5,793,966 A | 8/1998 | Amstein et al. | ........ | 395/200.33 |
| 5,956,487 A | 9/1999 | Venkatraman et al. | . | 395/200.48 |
| 6,009,274 A * | 12/1999 | Fletcher et al. | ............ | 717/173 |
| 6,023,727 A * | 2/2000 | Barrett et al. | ............ | 709/221 |
| 6,170,007 B1 | 1/2001 | Venkatraman et al. | ...... | 709/218 |
| 6,219,708 B1 | 4/2001 | Martenson | ............ | 709/226 |
| 6,281,790 B1 | 8/2001 | Kimmel et al. | ............ | 340/506 |
| 6,418,554 B1 * | 7/2002 | Delo et al. | ............ | 717/174 |
| 6,466,861 B2 * | 10/2002 | Little | ............ | 701/114 |
| 6,470,382 B1 * | 10/2002 | Wang et al. | ............ | 709/220 |
| 6,523,166 B1 * | 2/2003 | Mishra et al. | ............ | 717/174 |
| 6,754,896 B2 * | 6/2004 | Mishra et al. | ............ | 717/176 |
| 6,766,454 B1 * | 7/2004 | Riggins | ............ | 713/185 |
| 7,130,870 B1 * | 10/2006 | Pecina et al. | ............ | 707/203 |
| 7,130,897 B2 * | 10/2006 | Dervin et al. | ............ | 709/221 |
| 2001/0028654 A1 * | 10/2001 | Anjum et al. | ............ | 370/401 |
| 2002/0120685 A1 * | 8/2002 | Srivastava et al. | ........ | 709/203 |
| 2002/0143819 A1 * | 10/2002 | Han et al. | ............ | 707/513 |
| 2002/0156872 A1 * | 10/2002 | Brown | ............ | 709/219 |
| 2002/0165745 A1 * | 11/2002 | Greene et al. | ............ | 705/7 |
| 2002/0174206 A1 * | 11/2002 | Moyer et al. | ............ | 709/221 |
| 2002/0178186 A1 * | 11/2002 | Parry | ............ | 707/513 |
| 2002/0178213 A1 * | 11/2002 | Parry | ............ | 709/203 |
| 2003/0033519 A1 * | 2/2003 | Buckman et al. | ............ | 713/153 |
| 2003/0056207 A1 * | 3/2003 | Fischer et al. | ............ | 717/174 |

(Continued)

OTHER PUBLICATIONS

Lerning servlets: web programs with many purposes . . . Update Nov. 19, 2001 (www.javaskyline.com/learnservlets.html) 9 pages.*

(Continued)

*Primary Examiner*—Alina N. Boutah (57) ABSTRACT

Various systems and methods are provided for maintaining an embedded network server. In one embodiment, one method includes the steps of providing a dynamic service loader in the embedded network server, receiving a service request to install a dynamic service in the embedded network server, and installing the dynamic service in the embedded network server with the dynamic service loader. The dynamic service may be installed in the embedded network server dynamically, thereby allowing other aspects of the embedded network server to operate without disruption.

24 Claims, 6 Drawing Sheets

U.S. PATENT DOCUMENTS

| | | | |
|---|---|---|---|
| 2003/0097426 A1* | 5/2003 | Parry | 709/220 |
| 2003/0097464 A1* | 5/2003 | Martinez et al. | 709/238 |
| 2003/0144860 A1* | 7/2003 | Casati et al. | 705/1 |
| 2003/0145317 A1* | 7/2003 | Chamberlain | 717/177 |
| 2003/0191795 A1* | 10/2003 | Bernardin et al. | 709/105 |
| 2004/0181593 A1* | 9/2004 | Kanojia et al. | 709/220 |
| 2004/0260800 A1* | 12/2004 | Gu et al. | 709/223 |
| 2005/0021594 A1* | 1/2005 | Bernardin et al. | 709/200 |

OTHER PUBLICATIONS

Servers and servlet engines for Spy-server 5 pages. (www.phdcc.com/spy-server/server.htm).*

* cited by examiner

INSTALLATION OF NETWORK SERVICES IN AN EMBEDDED NETWORK SERVER

TECHNICAL FIELD

The present invention is generally related to the field of network based services and, more particularly, is related to the installation of services in a network server.

BACKGROUND OF THE INVENTION

Many devices may include embedded network servers in various devices such as personal computers, personal digital assistants (PDA's), network capable printers or other peripheral devices, and other devices. Such embedded network servers may be employed to provide remote access to static content stored on such devices across appropriate networks or other connections. In some situations, dynamic content may be made accessible through such devices. However, the maintenance of dynamic content can be problematic. Specifically, in order to install or remove a dynamic service from a network server, the network server is shut down and reconfigured, thereby making any static content or other services residing in the network server unavailable.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
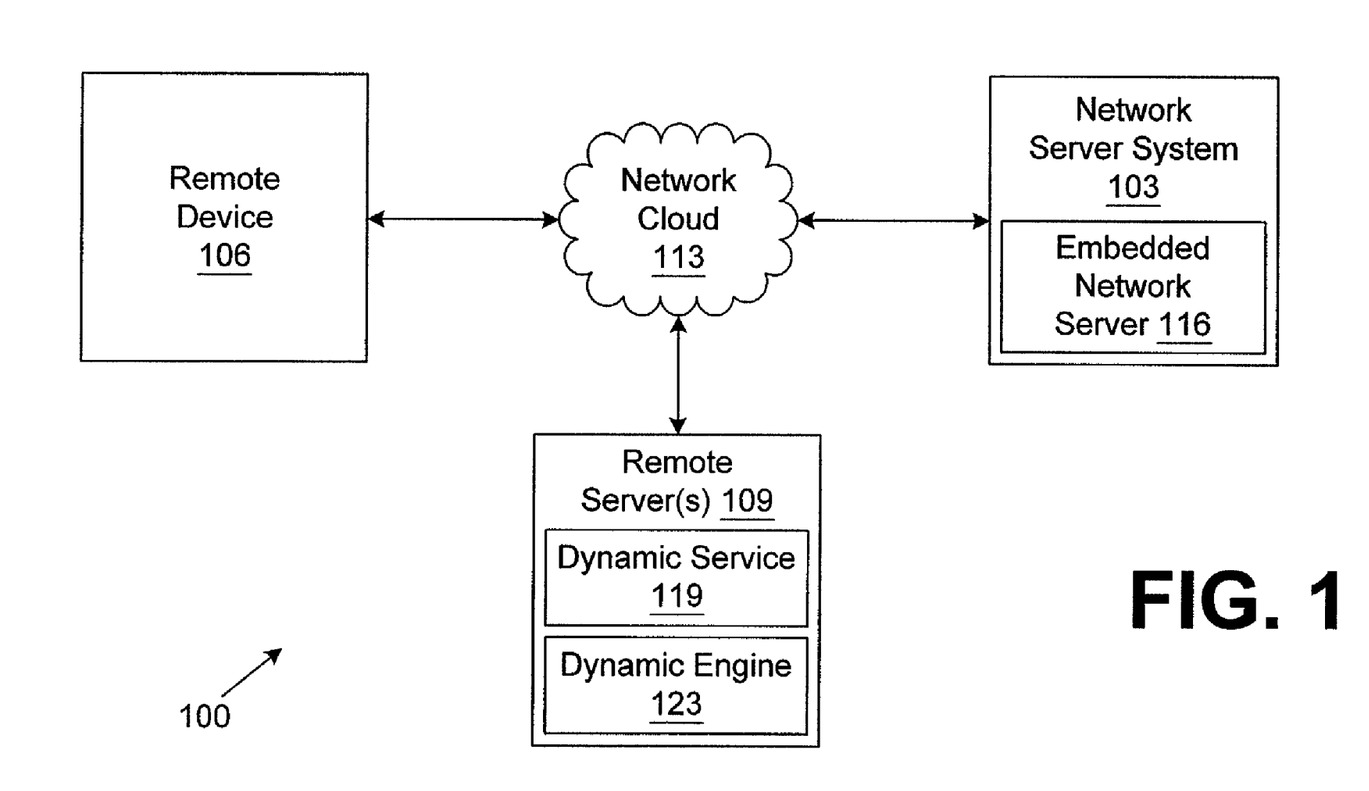
FIG. 1 is a block diagram of a network comprising a remote system and a network server system, both of which are coupled to a network cloud.

With reference to FIG. 1, shown is a network 100 according to an embodiment of the present invention. The network 100 includes a network server system 103, a remote system 106, and one or more remote servers 109, all of which are coupled to a network cloud 113. The network cloud 113 may represent one or more various networks that provide for data communications between any two devices coupled thereto. In this respect, the network cloud 113 may represent, for example, the Internet, intranets, wide area networks (WANs), local area networks, wireless networks, or other suitable networks, etc., or any combination of two or more such networks.

The network server system 103 may comprise or be included in, for example, a computer system, personal digital assistant or other device with like capability. The remote system 106 and remote server 109 may be, for example, computer systems or other devices with like capability. The network server system 103 includes an embedded network server 116 that can serve up various static content and dynamic services to other devices or clients on the network cloud 113. The remote servers 109 include one or more dynamic services 119 and one or more dynamic engines 123.

As we described, the embedded network server 116 may provide various dynamic services as well as static content to client devices through the network cloud 113. In this regard, the embedded network server 116 may operate according to a predefined data communications protocol such as, for example, A hypertext transfer protocol (HTTP), a hypertext transfer protocol secure (HTTPS), or other suitable protocol. In some situations, a user of a network server system 103 may wish to add additional dynamic services 119 to those services already existing within the embedded network server 116. According to an aspect of the present invention, the embedded network server 116 provides for the dynamic installation of additional dynamic service 119 and dynamic engines 123 to facilitate the operation of the dynamic services thereon. Specifically, the embedded network server 116 may be maintained by the remote device 106 that directs the installation of additional dynamic services 119 and dynamic engines 123 stored on the remote servers 109 at predetermined network addresses associated therewith. In this regard, the remote device 106 may include, for example, a browser or like system that can interface with the embedded network server 116.

Figure 2:
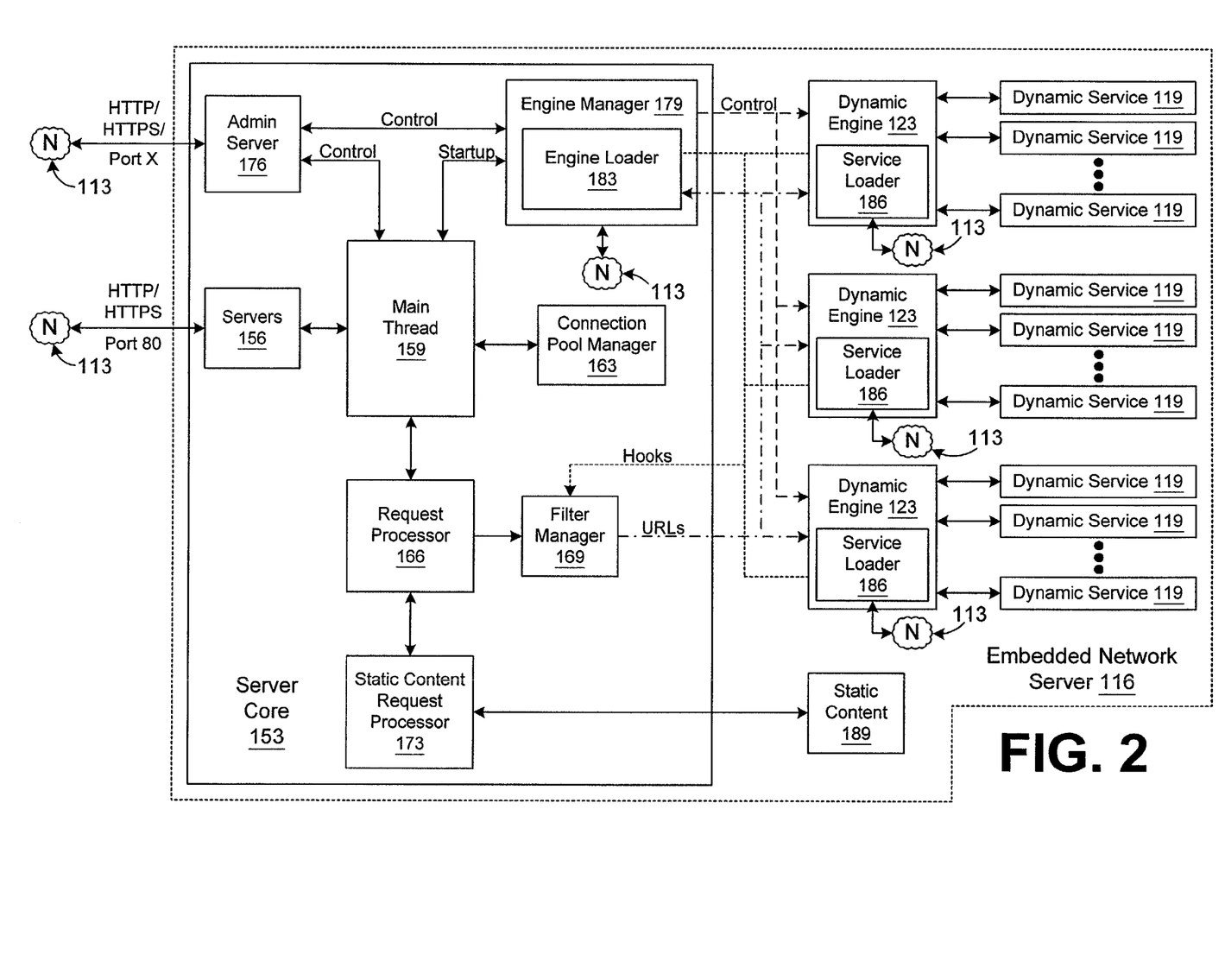
FIG. 2 is a functional block diagram of an embedded network server implemented in the network server system of FIG. 1.

Referring next to FIG. 2, shown is a block diagram of the embedded network server 116 according to an embodiment of the present invention. The embedded network server 116 includes a server core 153 with a number of components included therein. These components include one or more servers 156, a main thread 159, and a connection pool manager 163 that is associated with the main thread 159. The server core 153 also includes a request processor 166, a filter manager 169, and a static content request processor 173. The server core 153 also includes an administrative server 176 and an engine manager 179. The engine manager 179 includes an engine loader 183, the functionality of which will be discussed.

The embedded network server 116 also includes one or more dynamic engines 123. Associated with each dynamic engine 123 are one or more dynamic services 119. Each of the dynamic engines 123 includes a service loader 186. In addition, the embedded network server 116 also includes static content 189 that may be, for example, static web pages or like content as can be appreciated by those with ordinary skill in the art. The static content request processor 173 may be, for example, an HTTP Version 1.0/Version 1.1 request processor as is known by those with ordinary skill in the art.

Each of the above components in the embedded network server 116 may be implemented as software that is executed by general-purpose hardware or as special purpose hardware. Alternatively, the components may be implemented as combination of software and dedicated hardware.

Next the operation of the embedded network server 116 is provided. The servers 156 and the administrative server 176 listen on pre-assigned ports for network messages that are addressed to the server system 103. When data traffic addressed to the network server system 103 is received from the network represented by the network cloud 103, such traffic indicates a specific port in the network server system 103 for which the various data packets are intended as can be appreciated by those with ordinary skill in the art. For example, the server 156 may be listening on port 80 which is often reserved for traffic on the world wide web as is set forth by the hypertext transfer protocol (HTTP) as can be appreciated by those with ordinary skill in the art. In addition, a separate port may be assigned, for example, to the administrative server 176 to receive separate requests intended specifically for the administrative server 176. The act or function of "receiving" a request or other item of data as contemplated herein generally involves accepting data from an external communications system such as the network 113 and storing the data in a memory for future processing.

Assuming that a request for a dynamic service 119 or for static content 189 is received through port 80 by one of the servers 156, then server 156 provides the request to the main thread 159. The main thread 159 interacts with the connection pool manager 163 to see if any free connection exists with which the request may be processed. In this manner the connection pool manager 163 manages the number of different requests that may processed by the embedded network server 116 at a given time and limits that number to a predetermined value. If there is a free connection, then the main thread 159 provides the request to the request processor 166. Such requests may comprise, for example, a uniform resource locator (URL) as can be appreciated by those with ordinary skill in the art. The particular URL may be associated with one of the dynamic services 119, the engine manager 179, or with one or more pieces of static content 189 that are stored on the network server system 103 and are associated with the embedded network 116.

In this regard, the dynamic services 119 may be, for example, any network application that can be operated by a client that interfaces with the embedded network server 116 over the appropriate network represented by the network cloud 113 as can be appreciated by those with ordinary skill in the art. For example, the dynamic services 119 may provide the ability to configure or control various options relative to the operation of the device that hosts the network server system 103. To provide a specific example, if the network server system 103 is a personal digital assistant, then the dynamic service 119 may provide the ability to remotely update address book information, etc.

Upon receiving the request from the main thread 159, the request processor 166 applies the request to the filter manager 169. Each of the dynamic engines 123 and the engine manager 179 is registered or "hooked" to the filter manager 169, thereby hooking the dynamic engines 123 and the engine manager 179 with the server core 153. In this way, the filter manager 169 is informed of those dynamic engines 123 and the engine manager 179 that are associated with the embedded network server 116. Upon receiving the request from the request processor 166, the filter manager 169 proceeds to provide the URL to the engine manager 179 and to each of the dynamic engines 123 in a predetermined order. This provides each of the dynamic engines 123 an opportunity to determine whether one of its associated dynamic services 119 is to be invoked based upon the request. In this regard, each of the dynamic engines 123 acts as an interface between the filter manager 169 and respective ones of the dynamic services 119.

Each of the dynamic services 119 is registered or associated with a respective dynamic engine 123. Upon receiving the request or URL from the filter manager 169, a respective dynamic engine 123 performs a comparison between the URL and each of the dynamic services 119 to determine whether the respective dynamic services 199 are to process the request. In the case of the engine manager 179, the engine loader 183 acts in a manner similar to the dynamic services 119 in this regard. If a match is found, then the request is applied to the dynamic service 119 that performs whatever functions for which it was designed. The dynamic service 119 employs, for example, various functions provided by the server core 153 to write responses back to the requesting client and to close the thread associated with the request.

If none of the dynamic services 119 is responsive to a particular request, then the filter manager 169 obtains a negative result from each of the dynamic engines 123. The filter manager 169 then sends the request back to the request processor 166 informing the request processor 166 that no dynamic service 119 was responsive to the request. The request processor 166 then applies the request to the static content request processor 173 that searches through the static content 189 associated with the embedded network server 116 to obtain static content 189 that matches a request. In this regard the static content 189 may be either, for example, a web page or other comparable content. The static content 189 may be served, for example, from an in memory file store or from a secondary storage memory device, etc. If the desired static content 189 associated with the request is found, then the same is provided to the requesting client using various functions in the server core 153. Also, the connection or thread associated with the request is closed.

The administrative server 176 provides for administrative control over various aspects of the embedded network server 116 by a client through the network represented by the network cloud 113. The administrative server 176 generally handles a single thread or a transaction at a time. This means that other requests would be denied service while a particular transaction takes place. For example, a remote user may wish to halt the operation of the main thread 159. In such case, an appropriate request is sent to the administrative server 176 that causes a control command to be applied to the main thread 159 by the administrative sever 176 that, in turn, halts the operation of the main thread 159. In this regard, the control inputs to the main thread 159 may be, for example, to halt operation, initiate operation at startup, or to resume operation after a previous halt.

Likewise, various control commands may be received or generated by the servers 156 and the main thread 159 that are applied to the engine manager 179 through the request processor 166 and the filter manager 169. Alternatively, such requests may be received through other servers or the administrative server 176, etc. Such request may be, for example, to perform various operations with respect to the dynamic engines 123 or the dynamic services 119. One of these control commands may be applied to the engine manager 179 to install or delete a new dynamic engine 123. Specifically the engine manager 179 includes the engine loader 183 that may be executed to download and install a new dynamic engine 123 in the embedded network server 116. The engine loader 183 is designed to dynamically download and install a dynamic engine 123 in the embedded network server 116. For example, the servers 156 may receive a request or command that embodies a control command that is applied to the engine manager 179 to cause the engine manager 179 to initiate the function of the engine loader 183 to dynamically install an identified dynamic engine 123. As contemplated herein, "dynamic" installation is defined as installation of a component without interrupting or at least minimizing the interruption of the operation of other components in the embedded network server 116. Thus, the dynamic installation of a dynamic engine 123 in this manner does not interrupt the operation of the servers 156, the main thread 159, or other components of the server core 153. Note that in downloading a dynamic engine 123 for installation on the embedded network server 116, the engine loader 183 interfaces directly with clients through the network represented by the network cloud 113.

The tasks performed to install a dynamic engine 123 include, for example, downloading the dynamic engine 123 from the URL, loading the dynamic engine 123 using appropriate operating system functions, and then updating the data structure with information about the new dynamic engine 123. At the time that the data structure is updated with the information about the new dynamic engine 123, access to the remaining dynamic engines 123 maybe temporarily blocked. However, the functions of the server core 153 are not halted. To delete a dynamic engine 123, appropriate tasks are performed without interrupting the operation of the server core 153.

In addition, there are several control commands that may be sent from the administrative server 176 to the engine manager 179 in response to various requests received from the network represented by the network cloud 113. For example, such control commands may initiate, halt, or restart any one of the dynamic engines 186 or dynamic services 119.

Thus, a request may be received by the servers 156 that a new dynamic engine 123 is to be downloaded and installed in the embedded network server 116. Such a request would include a network address of the remote servers 109 where the desired dynamic engine 123 to be installed may be obtained. Ultimately, in response the engine loader 183 proceeds to download the dynamic engine 123 by generating a request that is transmitted to the destination address obtained from the original request. When installing one of the dynamic engines 123 in the embedded network server 116, the engine loader 183 installs a hook to the dynamic engine 123 with the filter manager 169. The installed hooks ensure that the dynamic engine 123 is consulted with all new requests or URLs as was described previously. There may be different dynamic engines 123 that are associated with different types of dynamic services 119 such as a universal plug-n-play (UPNP) engine, etc.

A request or command may be received through the servers 156 to install a dynamic service 119 that is to be associated with a respective dynamic engine 123. Such a request or command would be forwarded to the respective dynamic engine 123 with which the new dynamic service 119 is to be associated. Upon receiving the request/command to install a particular dynamic service 119, the dynamic engine 123 activates the service loader 186 associated therewith. The service loader 186 downloads the desired dynamic service 119 from the respective remote server 109 (FIG. 1) over the network represented by the network cloud 113. Once the dynamic service 119 has been downloaded, then the service loader 186 proceeds to perform the necessary tasks to install the dynamic service 119 within the embedded network server 116. The tasks performed to install a dynamic service 119 include, for example, downloading the dynamic service 119 from the URL, loading the dynamic service 119 using appropriate operating system functions, and then updating the data structure with information about the new dynamic service 119. At the time that the data structure is updated with the information about the new dynamic service 119, access to the remaining dynamic services 119 associated with the same dynamic engine 123 may be blocked. The engine manager may also generate control commands that are applied to the dynamic engines 123 such as, for example, halt commands, initiate commands, and other control commands.

Figure 3:
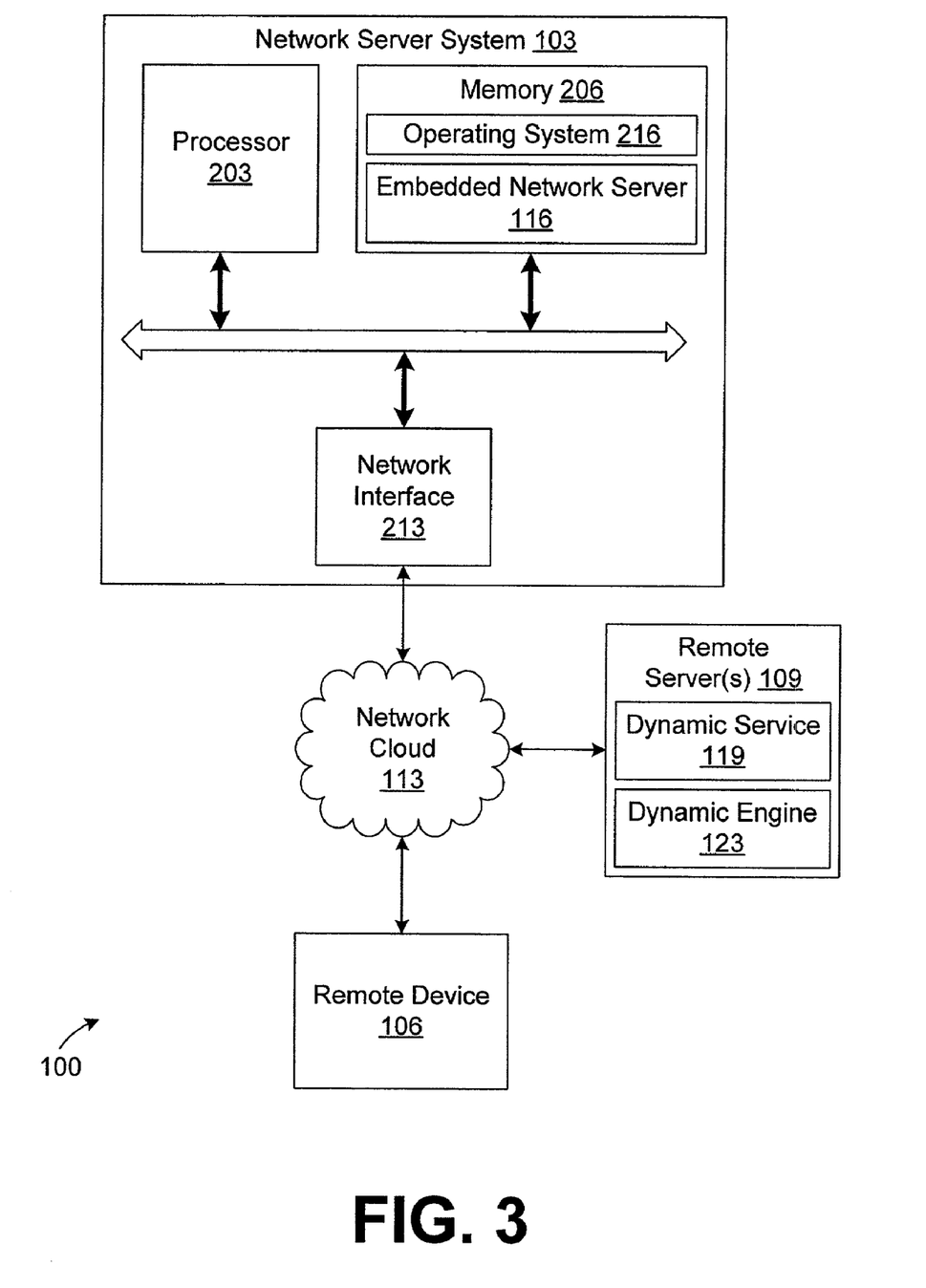
FIG. 3 is a block diagram of one embodiment of the network server system of FIG. 1.

With respect to FIG. 3, shown is a second view of the network 100 that more particularly illustrates one embodiment of the network server system 103. In this respect, the network server system 103 includes a processor circuit with a processor 203 and a memory 206, both of which are coupled to a local interface 209. The local interface 209 may be, for example, a data bus with an accompanying control/address bus as can be appreciated by those with ordinary skill in the art. The processor circuit is coupled to the network represented by the network cloud 113 through a network interface 213 which may be, by for example, an appropriate network card, circuit, or other such device.

Stored in the memory 206 and executable by the processor 203 is an operating system 216 and the embedded network server 116. Also, other applications and system software components may be stored in the memory 206 as can be appreciated by one with ordinary skill in the art.

The memory 206 is defined herein as both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 203 may represent multiple processors and the memory 206 may represent multiple memories that operate in parallel. In such a case, the local interface 209 may be an appropriate network that facilitates communication between any two of the multiple processors, between any processor and any one of the memories, or between any two of the memories etc. The processor 203 may be electrical, optical, or molecular in nature.

The operating system 216 is executed to control the allocation and usage of hardware resources in the network server system 103 such as the memory, processing time and peripheral devices. In this manner, the operating system 216 serves as the foundation on which applications depend as is generally known by those with ordinary skill in the art.

Figure 4:
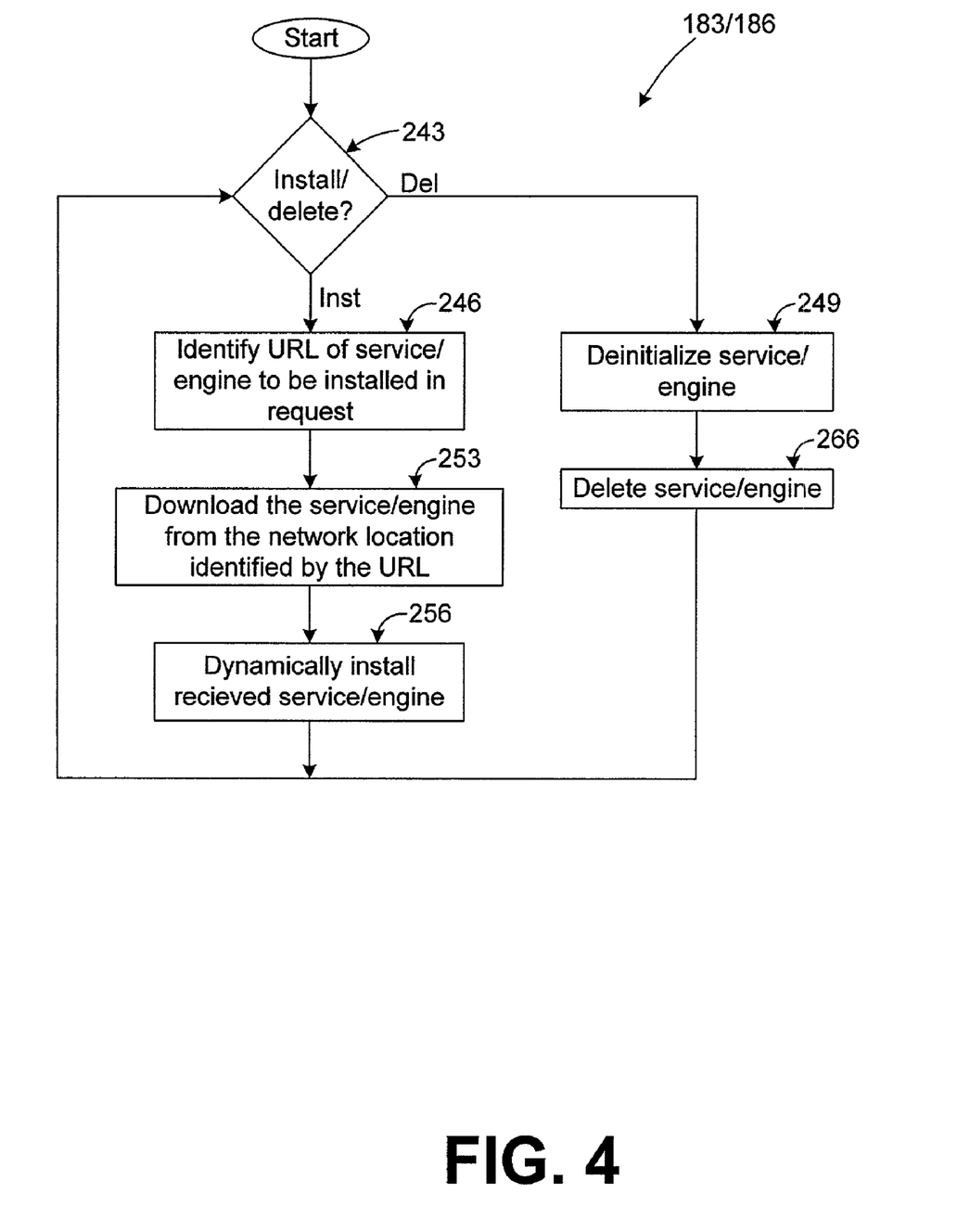
FIG. 4 is a flow chart of the operation of a service/engine loader employed in the embedded network server of FIG. 2.

With reference to FIG. 4, shown is a flow chart that details the operation of both the engine loader 183 and the service loader 186 according to an embodiment of the present invention. Alternatively, the flow chart of FIG. 4 may be viewed as depicting steps of a method implemented in the embedded network server 116 to download and install, or delete a dynamic engine 123 (FIG. 2) or a dynamic service 119 (FIG. 2). In addition, it is understood that the engine/service loader 183/186 may perform additional tasks not described herein.

Beginning with box 243, the engine/service loader 183/186 determines whether a dynamic engine 123 or dynamic service 119 is to be installed on or deleted from the embedded network server 116 based upon an appropriate request or command. If an installation is to take place, then the engine/service loader 183/186 proceeds to box 246. Otherwise, the engine/service loader 183/186 proceeds to box 249. In box 246, the uniform resource locator (URL) or other network address of the dynamic service 119 or dynamic engine 123 to be installed in the embedded network server 116 is identified in the command. Thereafter, in box 253, the dynamic service 119 or dynamic engine 123 is downloaded from the network location associated with the URL obtained in box 246. The URL thus acts as the network address of the dynamic service 119 or dynamic engine 123 as it is stored on one more remote servers 109 (FIG. 1).

Then, in box 256, the dynamic engine/service loader 183/186 dynamically installs the dynamic service 119 or dynamic engine 123 into the embedded network server 116 without interrupting or with minimal interruption of other dynamic services 119, dynamic engines 123 or other components of the server core 153. One interruption that may take place, for example, is when a new dynamic service 119 is installed, the operation of all dynamic services 119 associated with the respective dynamic engine 123 are temporarily halted while the data structure (i.e. the list of dynamic services associated with the respective dynamic engine 123) is updated. Thereafter, the engine/service loader 183/186 reverts back to block 243 to wait for the next request or command.

With reference back to box 249, assuming that the engine/service loader 183/186 is directed to delete a particular dynamic service 119 or dynamic engine 123, then in box 249 the respective dynamic service 119 or dynamic engine 123 identified in the request or command is de-initialized. Then, in box 266 the dynamic service/engine 119/123 is deleted. Thereafter, the engine/service loader 183/186 reverts back to box 243 as shown.

Figure 5:
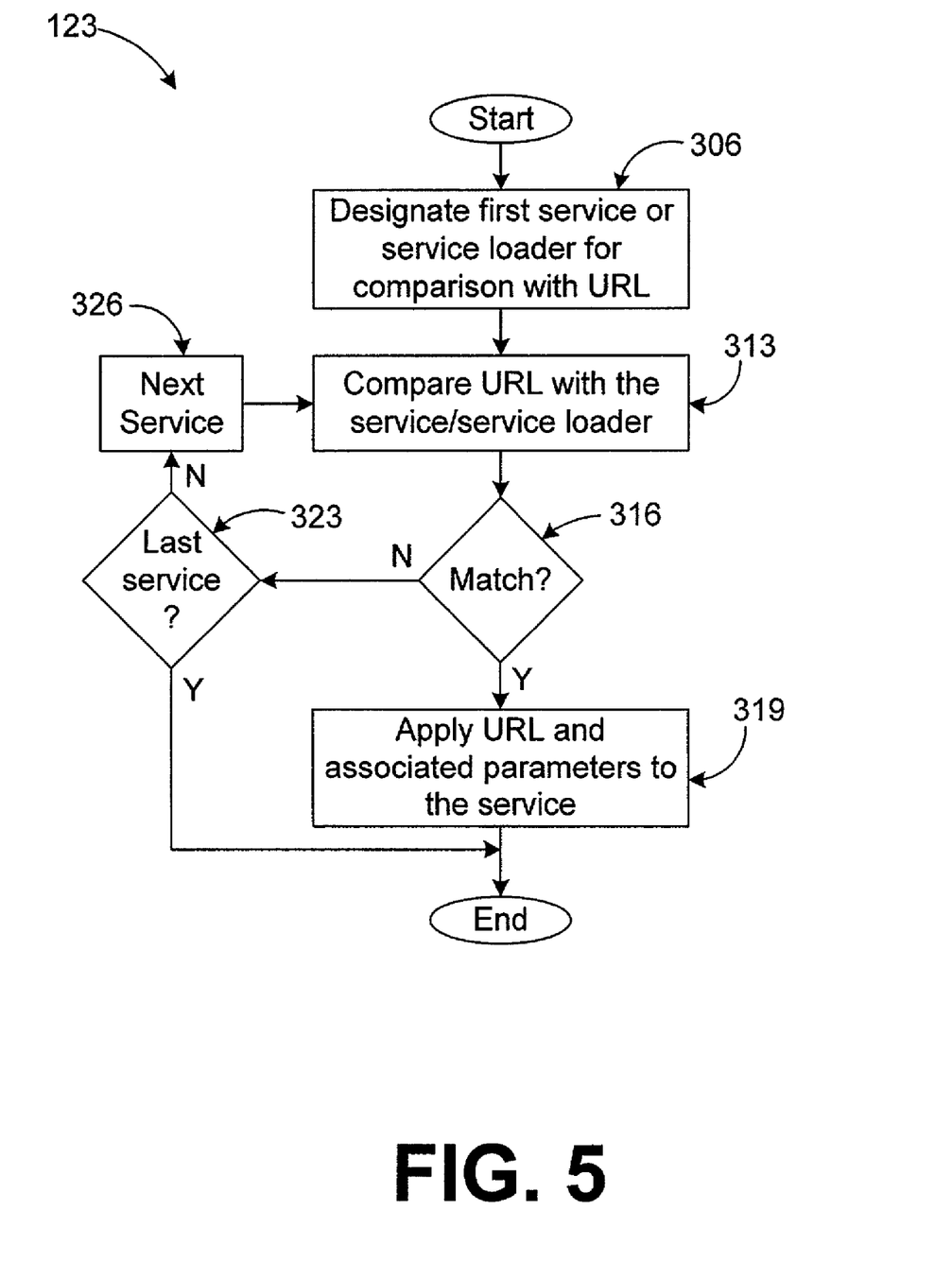
FIG. 5 is a flow chart of the operation of a dynamic engine employed in the embedded network server of FIG. 2.

Referring next to FIG. 5 shown is a flow chart of exemplary tasks performed by the dynamic engine 123. Alternatively, the flow chart of FIG. 5 may be viewed as depicting steps of a method implemented by the dynamic engine 123 in the embedded network server 116. In addition, it is understood that the dynamic engine 123 may perform additional tasks not described herein Beginning with box 306, the dynamic engine 123 designates a first one of the dynamic services 119 (FIG. 2) or the service loader 186 (FIG. 2) associated therewith for comparison with the URL or other identifier associated with the request that was provided by the filter manager 169 (FIG. 2). Thereafter, in box 313 the URL or other identifier is compared with the dynamic service 119 or service loader 186 for a match. In box 316, if a match exists, then the dynamic engine 123 proceeds to box 319. Otherwise, the dynamic engine 123 moves to box 323. Assuming that there is no match in box 316, then the dynamic engine 123 determines whether the last dynamic service 119 that is associated with the respective dynamic engine 123 has been compared with the URL or other identifier in box 313. If such is the case, then the dynamic engine 123 ends. Otherwise, the dynamic engine 123 proceeds to box 326 in which the next dynamic service 119 for comparison is identified. Thereafter, the dynamic engine 123 reverts back to box 313.

Assuming the dynamic engine proceeds to box 319, then the URL or other identifier and any parameters associated therewith are applied to the respective dynamic service 119 for which such information is intended based upon a match determined in box 316. The dynamic service 119 responds employing various functions provided by the server core 153 to write responses back to the requesting client and to close the thread associated with the request. Thereafter, the dynamic engine 123 ends.

Figure 6:
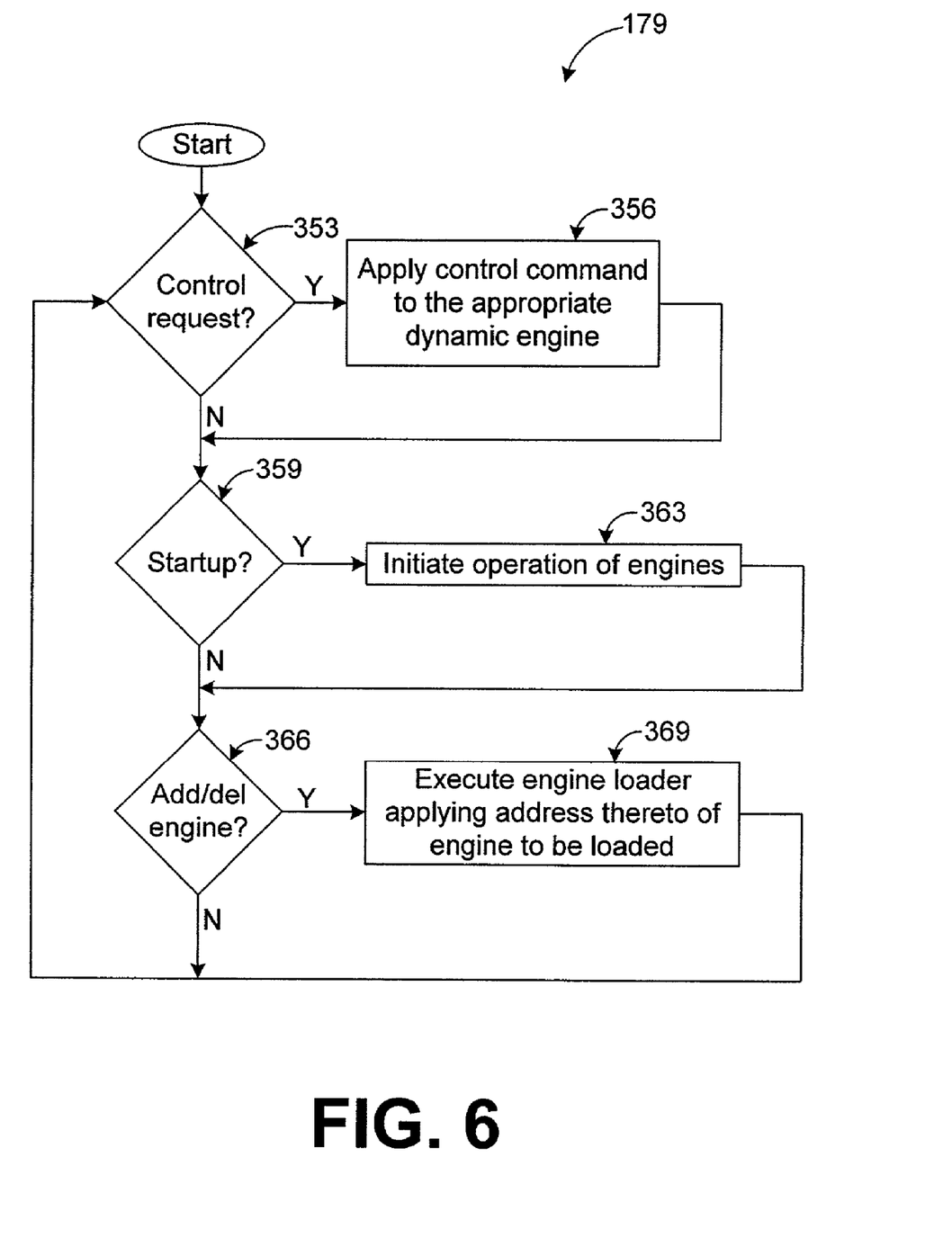
FIG. 6 is a flow chart of the operation of an engine manager employed in the embedded network server of FIG. 2.

With reference to FIG. 6, shown is a flow chart of exemplary tasks performed by the engine manager 129 according to another embodiment of the present invention. Alternatively, the flow chart of FIG. 6 may be viewed as depicting steps of a method implemented in the embedded network server 116 to provide an interface by which a client may transmit specific commands to the dynamic engines 123 and the engine loader 183. This is done in order to perform various tasks in the embedded network server in a dynamic manner such that full shut down of the embedded network server 116 is not necessary. In addition, it is understood that the engine manager 129 may perform additional tasks not described herein.

Beginning with box 353, the engine manager 179 determines whether a particular control command or request received from the administrative server 176 (FIG. 2) is to be passed on to one of the dynamic engines 123 (FIG. 2). Alternatively, such a command may be obtained from the filter manager 169 through the main thread 159, etc. If such is the case, then the engine manager 179 proceeds to box 356 in which the control command is applied to the appropriate dynamic engine 123. If there is no command to be passed on to the dynamic engine 123, or, provided that a command was passed on to an appropriate dynamic engine 123 in box 356, then the engine manager proceeds to box 359.

In box 359 a determination is made as to whether a startup condition exists. A startup condition exists, for example, when the embedded network server 116 is first powered up. This may be determined when an appropriate command is sent to the engine manager 179 from the main thread 159 (FIG. 2). If a startup condition exists, then the engine manager 179 proceeds to box 363. Otherwise, the engine manager 179 proceeds to box 366. In box 363 the various dynamic engines 123 associated with the embedded network server 116 are executed. Thereafter, the engine manager 179 proceeds to box 366.

In box 366, it is determined whether a dynamic engine 123 is to be added or deleted from the embedded network server 116 based upon a request received from the filter manager 169 through the main thread 159 or, alternatively, the administrative server 176. If so then the engine manager 179 proceeds to box 369 to execute the engine loader 183 applying an appropriate address of the dynamic engine 123 to be installed thereto. The engine loader 183 then proceeds to perform the various functions as was described with reference to FIG. 4. Thereafter, the engine manager 179 reverts back to box 353. Also, if no engine is be installed or deleted to the embedded network server 116 in box 366, then the engine manager 179 reverts back to box 363.

In addition, various computer programming languages may be employed to create the various components such as, for example, the engine manager 179, engine/service loaders 183/186, dynamic engines 123, dynamic services 119, filter manager 169, and other components, etc. Such languages may include, for example, C, C++, Java Scripts, Servlets, Java Server Pages, CGI Scripts, or other languages.

Although the embedded network server 116 may be discussed above as being embodied in software or code executed by general purpose hardware, as an alternative it may also be embodied in dedicated hardware or a combination of software/general purpose hardware and dedicated hardware. If embodied in dedicated hardware, the embedded network server 116 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 2-6 show the architecture, functionality, and operation of an implementation of the embedded network server 116 and components thereof. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the embedded network server 116 or any of the components included therein comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the embedded network server 116 and/or the components included therein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for maintaining an embedded network server, comprising:
    providing a dynamic engine in the embedded network server;
    providing a dynamic service loader in the dynamic engine in the embedded network server;
    receiving a service request to install a dynamic service in the embedded network server; and
    installing the dynamic service in the embedded network server with the dynamic service loader in the dynamic engine without shutting down the embedded network server, wherein said installing occurs with substantially all static content and services remaining available, and further wherein receiving the service request causes the dynamic engine to determine whether at least one dynamic service is to be invoked based on the service request.

2. The method of claim 1, wherein the receiving of the service request to install the dynamic service in the embedded network server further comprises receiving a network address associated with the dynamic service in the request.

3. The method of claim 2, wherein the installing of the dynamic service in the embedded network server with the dynamic service loader further comprises downloading the dynamic service from a network location indicated by the network address.

4. The method of claim 1, further comprising:
    providing a dynamic engine loader in the embedded network server;
    receiving an engine request to install the dynamic engine in the embedded network server; and
    installing the dynamic engine in the embedded network server with the dynamic engine loader, wherein the dynamic engine provides an interface between the dynamic service and a server core of the embedded network server.

5. The method of claim 4, wherein the receiving of the engine request to install the dynamic engine in the embedded network server further comprises receiving a network address associated with the dynamic engine in the engine request.

6. The method of claim 5, wherein the installing of the dynamic engine in the embedded network server with the dynamic service loader further comprises downloading the dynamic engine from a network location indicated by the network address.

7. The method of claim 4, further comprising hooking the dynamic engine with the server core, whereby the server core can query the service engine with at least one dynamic service request.

8. The method of claim 4, further comprising hooking the dynamic service with the dynamic service engine, whereby the dynamic service engine can query the service engine with at least one dynamic service request.

9. The method of claim 4, further comprising controlling an operation of the dynamic service engine in response to a control request received by the embedded network server.

10. The method of claim 4, wherein the controlling of the operation of the dynamic service engine in response to the control request received by the embedded network server further comprises halting an operation of the dynamic service engine.

11. The method of claim 4, wherein the controlling of the operation of the dynamic service engine in response to the control request received by the embedded network server further comprises initiating an operation of the dynamic service engine.

12. A program embodied in a computer readable medium for network server maintenance, comprising:
    a dynamic engine configured to receive a service request, the dynamic engine comprising a dynamic service loader; and
    code that initiates the dynamic service loader to install a dynamic service in the embedded network server in response to a service request to install the dynamic service in the embedded network server without shutting down the embedded network server, wherein said dynamic service installation occurs with substantially all static content and services remaining available, and further wherein the dynamic engine is configured to determine whether at least one dynamic service is to be invoked based on the service request.

13. The program embodied in a computer readable medium of claim 12, wherein the code that initiates the dynamic service loader to install the dynamic service in the embedded network server further comprises code that applies a network address obtained from the service request to the dynamic service loader, the network address being associated with the dynamic service.

14. The program embodied in a computer readable medium of claim 13, wherein the dynamic service loader further comprises code that downloads the dynamic service from a network location indicated by the network address.

15. The program embodied in a computer readable medium of claim 13, further comprising:
 a dynamic engine loader; and
 code that initiates the dynamic engine loader to install the dynamic engine in the embedded network server in response to an engine request to install the dynamic engine in the embedded network server, wherein the dynamic engine provides an interface between the dynamic service and a server core of the embedded network server.

16. The program embodied in a computer readable medium of claim 15, wherein the code that initiates the dynamic engine loader to install the dynamic engine in the embedded network server further comprises code that applies a network address obtained from the engine request to the dynamic engine loader, the network address being associated with the dynamic engine.

17. The program embodied in a computer readable medium of claim 16, wherein the dynamic engine loader further comprises code that downloads the dynamic engine from a network location indicated by the network address.

18. The program embodied in a computer readable medium of claim 15, wherein the dynamic engine loader further comprises code that hooks the dynamic engine with the server core, whereby the server core can query the service engine with at least one dynamic service request.

19. A network server system, comprising:
 a processor circuit having a processor and a memory; and
 an embedded network server stored in the memory and executable by the processor, the embedded network server comprising:
 a network core including a dynamic engine loader;
 a dynamic service loader;
 logic that initiates the dynamic service loader to install a dynamic service in the embedded network server in response to a service request to install the dynamic service in the embedded network server; and
 logic that initiates the dynamic engine loader to install a dynamic engine in the embedded network server in response to an engine request to install the dynamic engine in the embedded network server, wherein the dynamic engine provides an interface between the dynamic service and a server core of the embedded network server without shutting down the embedded network server, wherein said dynamic engine installation occurs while substantially all static content and services remain available, and further wherein the dynamic engine is configured to determine whether at least one dynamic service is to be invoked based on the service request.

20. The network server system of claim 19, wherein the logic that initiates the dynamic service loader to install the dynamic service in the embedded network server further comprises logic that applies a network address obtained from the service request to the dynamic service loader, the network address being associated with the dynamic service.

21. The network server system of claim 20, wherein the dynamic service loader further comprises logic that downloads the dynamic service from a network location indicated by the network address.

22. A network server system, comprising:
 an embedded network server having a server core;
 means in the embedded network server for downloading and installing a dynamic engine in the embedded network server in response to an engine request; and
 means in the embedded network server for downloading and installing a dynamic service in the embedded network server in response to a service request without shutting down the embedded network server, wherein said installing occurs with substantially all static content and services remaining available, and further wherein the dynamic engine is configured to determine whether at least one dynamic service is to be invoked based on the service request.

23. The system of claim 22, wherein the means for downloading and installing the dynamic engine in the embedded network server in response to the engine request further comprises means for downloading the dynamic engine from a network address obtained from the engine request.

24. The system of claim 22, wherein means in the embedded network server for downloading and installing the dynamic service in the embedded network server in response to the service request further comprises means for downloading the dynamic service from a network address obtained from the service request.

\* \* \* \* \*